(12) United States Patent  
Kilgore

(10) Patent No.: US 9,495,450 B2  
(45) Date of Patent: Nov. 15, 2016

(54) AUDIO ANIMATION METHODS AND APPARATUS UTILIZING A PROBABILITY CRITERION FOR FRAME TRANSITIONS

(75) Inventor: Robert M. Kilgore, Brooklyn, NY (US)

(73) Assignee: Nuance Communications, Inc., Burlington, MA (US)

( * ) Notice: Subject to any disclaimer, the term of this patent is extended or adjusted under 35 U.S.C. 154(b) by 965 days.

(21) Appl. No.: 13/494,148

(22) Filed: Jun. 12, 2012

(65) Prior Publication Data

US 2013/0332167 A1    Dec. 12, 2013

(51) Int. Cl.
| | |
|---|---|
| *G10L 15/00* | (2013.01) |
| *G10L 21/00* | (2013.01) |
| *G10L 19/00* | (2013.01) |
| *G06F 17/30* | (2006.01) |
| *G10L 15/22* | (2006.01) |
| *G09B 5/04* | (2006.01) |
| *H04M 3/493* | (2006.01) |
| *H04M 3/56* | (2006.01) |
| *G10L 15/26* | (2006.01) |

(52) U.S. Cl.
CPC ........... *G06F 17/30775* (2013.01); *G09B 5/04* (2013.01); *G10L 15/22* (2013.01); *H04M 3/4938* (2013.01); *H04M 3/567* (2013.01); *G10L 15/26* (2013.01)

(58) Field of Classification Search
CPC ....... G10L 15/22; G10L 15/265; G10L 19/22
USPC .................................... 704/275, 219
See application file for complete search history.

(56) References Cited

U.S. PATENT DOCUMENTS

| | | | |
|---|---|---|---|
| 6,334,104 B1 * | 12/2001 | Hirai ..................... | G10L 13/047 463/40 |
| 6,388,665 B1 | 5/2002 | Linnett et al. | |
| 6,874,018 B2 * | 3/2005 | Wu .............................. | 709/219 |
| 7,904,922 B1 * | 3/2011 | Haberman ........... | G06Q 10/107 715/201 |
| 2005/0222846 A1 * | 10/2005 | Tomes ........................ | 704/275 |
| 2007/0293315 A1 * | 12/2007 | Mizuta .................... | A63F 13/10 463/36 |

* cited by examiner

*Primary Examiner* — Farzad Kazeminezhad  
(74) *Attorney, Agent, or Firm* — Wolf, Greenfield & Sacks, P.C.

(57) ABSTRACT

According to some aspects, a method of providing an interactive audio presentation, at least in part, by traversing a plurality of audio animations, each audio animation comprising a plurality of frames, each of the plurality of frames comprising a duration, at least one audio element, and at least one gate indicating criteria for transitioning to and identification of a subsequent frame according to one or more probabilities, and/or a subsequent animation is provided. The method comprises rendering a first audio animation, receiving input from the user associated with the presentation, selecting a second audio animation based, at least in part, on the input, and rendering the second audio animation. Some aspects include a system for performing the above method and some aspects include a computer readable medium storing instructions that perform the above method when executed by at least one processor.

37 Claims, 9 Drawing Sheets

```xml
<version="1.0" encoding="UTF-8">
<AudioPresentation version="1.0">
  <Animations>
    <Animation name="introduction">
      <Frame duration="0">
        <Content>
          564 → <Audio volume="20" pan="0" loop="Y" filename="Intro_Music.mp3" />
        </Content>
        <Gate>
          565 → <Logic type="termination" destination="2" value="100" />
        </Gate>
      </Frame>
      <Frame duration="/Content/Audio/1">
        <Content>
          568 → <Audio volume="100" pan="0" loop="N" filename="Intro_Speech.mp3" />
        </Content>
        <Gate>
          569 → <Logic type="probability" destination="3" value="100" />
        </Gate>
      </Frame>
    </Animation>
    <Animation name="background_sounds">
      <Frame duration="0">
        <Content>
          <Audio volume="20" pan="0" loop="Y" filename="Intro_Music.mp3" />
        </Content>
        <Gate>
          574 → <Logic type="time_past_hour" destination="7" lower="0" upper="5" />
          576 → <Logic type="time_past_hour" destination="4" lower="6" upper="1799" />
          578 → <Logic type="time_past_hour" destination="7" lower="1800" upper="1805" />
          580 → <Logic type="time_past_hour" destination="4" lower="1806" upper="3599" />
        </Gate>
      </Frame>
      <Frame duration="0">
        ...
```

FIG. 5B

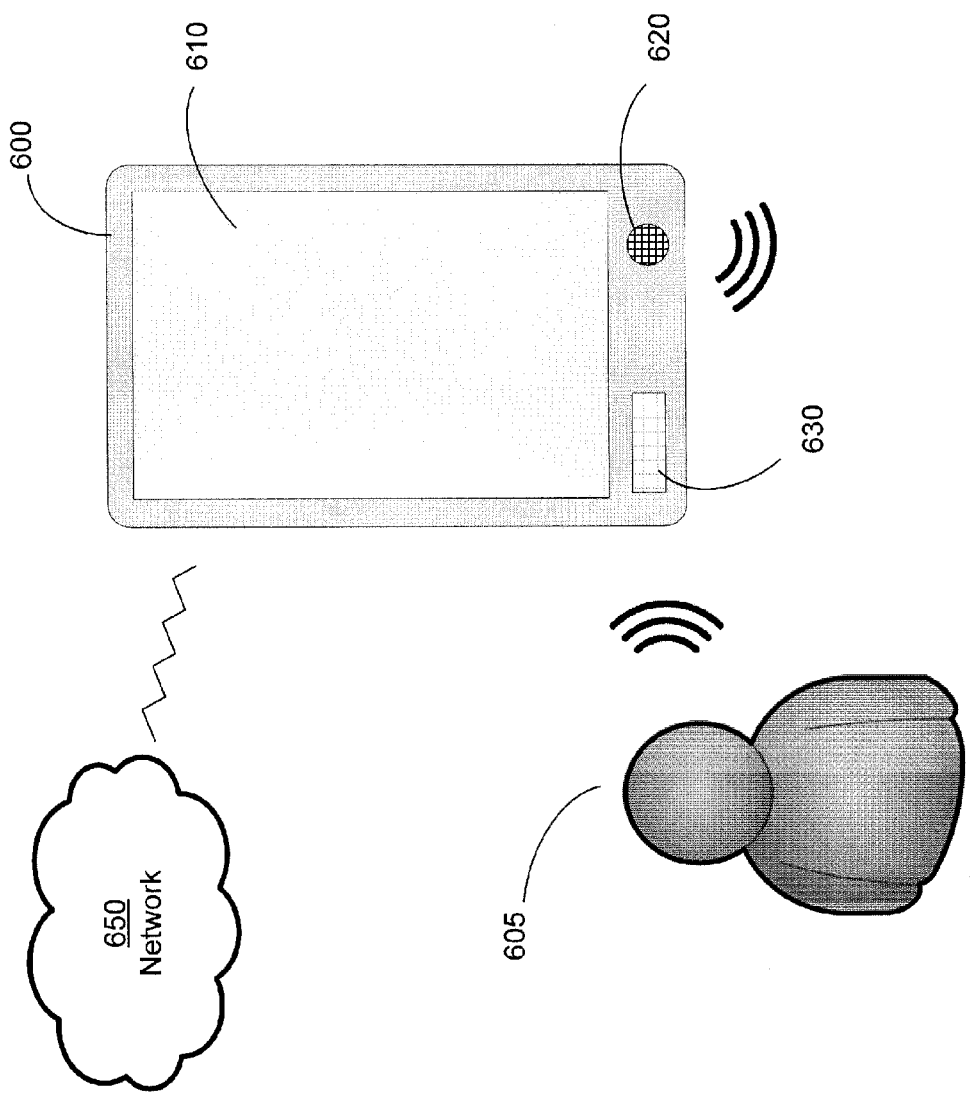

AUDIO ANIMATION METHODS AND APPARATUS UTILIZING A PROBABILITY CRITERION FOR FRAME TRANSITIONS

BACKGROUND

Conventional interactive audiobooks are typically limited both by the options available to the user in interacting with the audiobook, and with respect to the flexibility, richness and/or depth of the content capable of being presented to the user. With respect to the former, users of conventional interactive audiobooks are generally limited to a small set of actions that are typically fixed and relatively restrictive. For example, with respect to narrative audiobooks, the user may be provided a small number of options to choose from at fixed points in the narrative. This "there is a fork in the road" style functionality constrains the user in ways that may make the experience unsatisfying.

With respect to the presentation, conventional audiobooks typically play one or more fixed and pre-recorded segments of audio in response to a user selecting one of the small number of fixed options presented. As a result, many conventional narrative audiobooks are simply audio renderings of the "Choose Your Own Adventure®" style of printed book where the user navigates through a tree of fixed possibilities, resulting in an environment that feels limited and lacking in richness and depth.

SUMMARY

Some embodiments include a method of providing an interactive audio presentation, at least in part, by traversing a plurality of audio animations, each audio animation comprising a plurality of frames, each of the plurality of frames comprising a duration, at least one audio element, and at least one gate indicating criteria for transitioning to and identification of a subsequent frame and/or a subsequent animation. The method may comprise rendering a first audio animation by traversing a first plurality of frames, wherein at least one of the first plurality of frames includes, as the at least one audio element, a portion of narrative associated with the presentation that is audibly rendered to a user, wherein traversing the first plurality of frames includes audibly rendering at least one audio element in a current frame of the first plurality of frames and identifying and transitioning to a next frame of the first plurality of frames according to the at least one gate of the current frame, receiving input from the user associated with the presentation, selecting a second audio animation based, at least in part, on the input, and rendering the second audio animation.

Some embodiments include at least one computer readable medium storing instructions that, when executed by at least one processor, performs a method of providing an interactive audio presentation, at least in part, by traversing a plurality of audio animations, each audio animation comprising a plurality of frames, each of the plurality of frames comprising a duration, at least one audio element, and at least one gate indicating criteria for transitioning to and identification of a subsequent frame and/or a subsequent animation. The method may comprise rendering a first audio animation by traversing a first plurality of frames, wherein at least one of the first plurality of frames includes, as the at least one audio element, a portion of narrative associated with the presentation that is audibly rendered to a user, wherein traversing the first plurality of frames includes audibly rendering at least one audio element in a current frame of the first plurality of frames and identifying and transitioning to a next frame of the first plurality of frames according to the at least one gate of the current frame, receiving input from the user associated with the presentation, selecting a second audio animation based, at least in part, on the input, and rendering the second audio animation.

Some embodiments include a system for providing an interactive audio presentation, at least in part, by traversing a plurality of audio animations, each audio animation comprising a plurality of frames, each of the plurality of frames comprising a duration, at least one audio element, and at least one gate indicating criteria for transitioning to and identification of a subsequent frame and/or a subsequent animation. The system may comprise at least one computer readable medium for storing the audio animation, and at least one processor capable of accessing the at least one computer readable medium, the at least one processor configured to render a first audio animation by traversing a first plurality of frames, wherein at least one of the first plurality of frames includes, as the at least one audio element, a portion of narrative associated with the presentation that is audibly rendered to a user, wherein traversing the first plurality of frames includes audibly rendering at least one audio element in a current frame of the first plurality of frames and identifying and transitioning to a next frame of the first plurality of frames according to the at least one gate of the current frame, select a second audio animation based, at least in part, on input from the user associated with the presentation, and render the second audio animation.

BRIEF DESCRIPTION OF DRAWINGS

The accompanying drawings are not intended to be drawn to scale. In the drawings, for purposes of clarity, not every component may be labeled in every drawing. In the drawings:

FIG. 5B shows example markup code of a structured document suitable for storing data describing one or more audio animations, according to some embodiments;

FIG. 6 is a perspective view of an output device, according to some embodiments;

DETAILED DESCRIPTION

Figure 1:
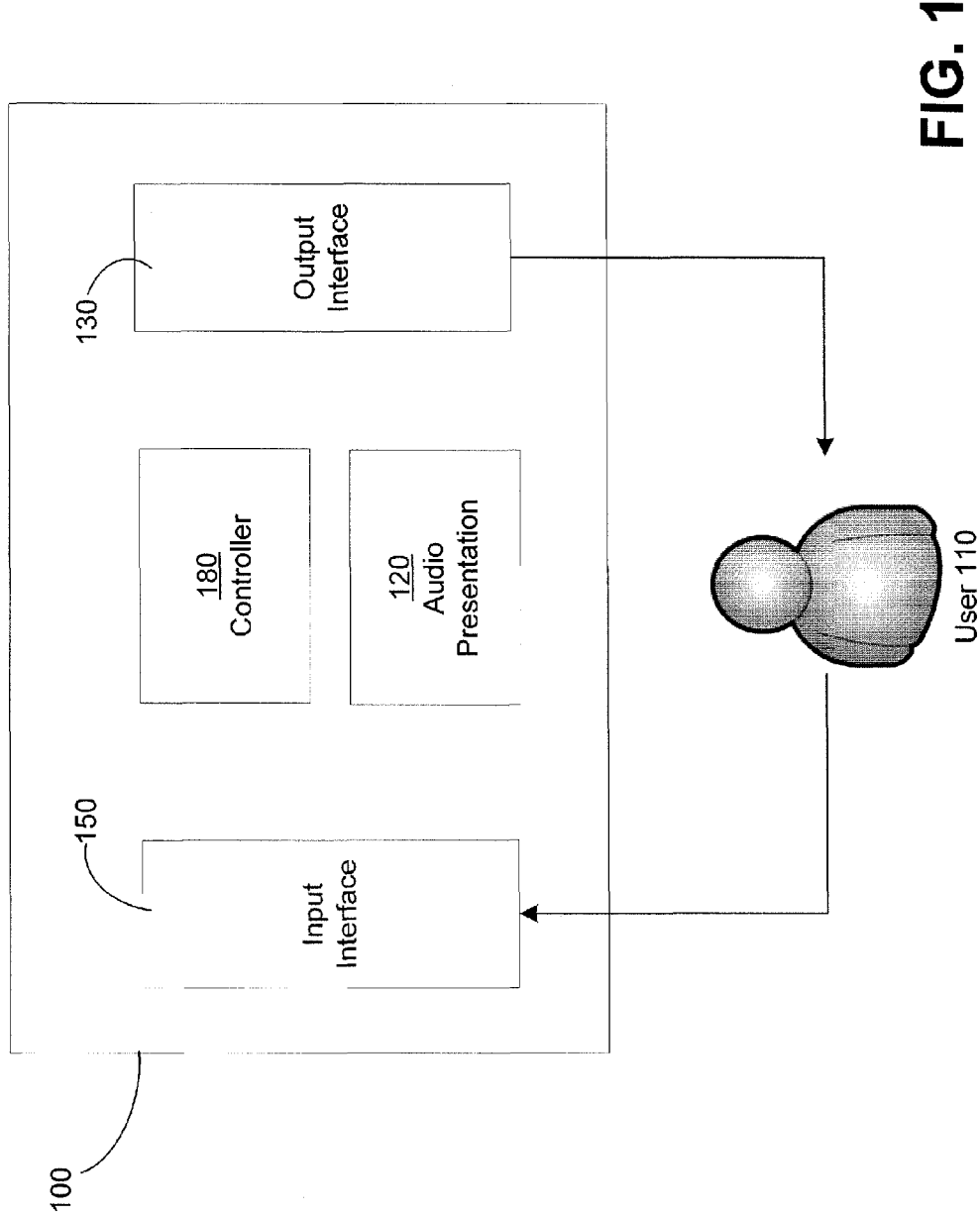
FIG. 1 illustrates a system suitable for providing an audio presentation according to some embodiments.

As discussed above, conventional audiobooks are typically limited in flexibility, breadth and depth, both with respect to user interaction with the audiobook and presentation of content by the audiobook to the user. The inventor has recognized and appreciated that an interactive audio presentation may be produced and provided in an extensible and flexible manner by presenting a plurality of audio animations to the user. An audio animation refers generally to one or more frames traversed according to respective gates that specify criteria for transitioning from a current frame and that identify a next frame for traversal. Each frame in an audio animation may include one or more audio elements that are rendered during traversal of the corresponding frame.

The audio animation techniques described herein may provide a flexible and extensible way to generate interactive audio presentations, which may be applied to any suitable type of audio presentation for which user interactivity may be desired. Exemplary applications for audio animation include interactive audiobooks, interactive user guides or manuals, interactive advertisements, interactive recipe books, etc. It should be appreciated that audio animation techniques described herein may be applied to other types of audio presentations, as the particular application for which audio animation techniques are used is not limited in this respect.

As discussed above, an audio animation typically involves providing gates that define exit criteria for a frame and criteria by which at least one subsequent frame for traversal is identified or selected. Criteria for frame traversal may comprise user input, including speech input such that frame traversal may be guided, at least in part, via user interactivity. In addition, or alternatively, the criteria guiding frame traversal may include any one or combination of: random events, one or more probabilities, a duration of time, characteristics of the present audiobook environment, characteristics of a user's environment (e.g., weather, time of day, etc.), user data, dynamically determined values, or other criteria suitable for guiding the transition between frames in an audio animation and/or the order of audio animation traversal. By employing gates that use one or more of the above mentioned exemplary criteria, a richer level of interactivity between the user and the audio presentation may be achieved, and a more dynamic and flexible audio presentation may be produced.

Gate criteria facilitate an audio presentation that can traverse audio animations in dynamic ways guided by user interactivity. User input, occurrence of one or more events (which may be random or may be user initiated), or other factors may impact how an audio animation is traversed and in what order to facilitate a dynamic presentation. To use an example in the context of an audiobook, during traversal of an audio animation rendering a portion of a narrative, the user may issue a command (e.g., via speech, keyboard, touchpad, etc.) to control the behavior of a character in the narrative or the environment of the narrative. Depending on the command, it may no longer make sense to continue rendering the audio animation according to the current traversal path.

In this respect, the audio presentation may adjust the traversal of the audio animation (and one or more subsequent audio animations) to adapt to user input, for example, by skipping one or more frames in the audio animation or electing to jump to an appropriate frame in the present or different audio animation. As such, user input may impact the traversal of the present audio animation and/or one or more subsequent audio animations such that the narrative unfolds intuitively in correspondence with user input. This principle may also be used to expedite transition to the next portion of the narrative based on user input, may provide a mechanism for implementing a "hurry-up" mode, and/or may alter the narrative for portions the user has previously experienced (thus providing an abridged narrative), etc.

Following below are more detailed descriptions of various concepts related to, and embodiments of, methods and apparatus according to the present invention. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts a schematic view of a system 100 suitable for practicing audio presentation techniques according to some embodiments. In particular, system 100 is configured to provide an audio presentation 120 with which one or more users, such as user 110, may interact. To this end, system 100 may include an output interface 130 capable of presenting audio to a user. For example, output interface 130 may include audio processing capabilities and at least one speaker configured to deliver audio to the user according to the audio presentation 120. Output interface 130 may also include other output devices such as a display capable of providing text, graphics, video or other output to be visually rendered to the user.

System 100 also includes input interface 150 that allows user 110 to interact with system 100, and in particular, to interact with audio presentation 120. Input interface 150 may be any one or combination of input devices capable of receiving user input, and may depend on the type of input the system supports. For example, input interface 150 may include one or more microphones that allow user 110 to interact with the system using speech. It should be appreciated that input interface 150 may include any type of input component or device, alone or in any combination, that allows a user to input information in any number of different ways, including but not limited to microphone, keypad, touch screen, mouse, writing pad, etc., some examples of which are discussed in further detail below.

Audio presentation 120 includes a plurality of audio animations that can be presented to the user based on any number and/or type of events, including one or any combination of user input, random chance, user data, the user's environment, etc. Each audio animation includes a plurality of frames including audio elements to be rendered to the user and instructions on how to traverse the frames and animations based on user interaction and/or any other factor mentioned above, as discussed in further detail below. Accordingly, audio presentation 120 comprises a plurality of audio files and instructions, typically in the form of program code (e.g., compiled code, scripts, and/or instructions provided in any structured format), that describe how to traverse the audio animations. It should be appreciated that audio presentation 120 may be a combination of software and hardware (e.g., program instructions stored on at least one computer readable medium that perform, at least in part, the functionality of the audio presentation when executed on one or more processors).

System 100 also includes controller 180 to control one or more aspects of the functionality of the system. For example, controller 180 may include one or more processors for executing software, firmware or microcode programmed to control and/or perform some functionality of output interface 130 and/or input interface 150 and to process audio presentation 120. Controller 180 may include one or more processors, control units, memories, interconnections and/or other hardware or software functionality to allow communication and interaction between the components of system 100. Controller 180 may be formed from any combination of hardware, software and/or firmware to facilitate operation of the system and to execute audio presentation 120. Audio presentation 120 may include an interactive audiobook, an interactive instruction manual, an interactive advertisement, an interactive recipe book or any other suitable type of interactive audio presentation.

Figure 2:
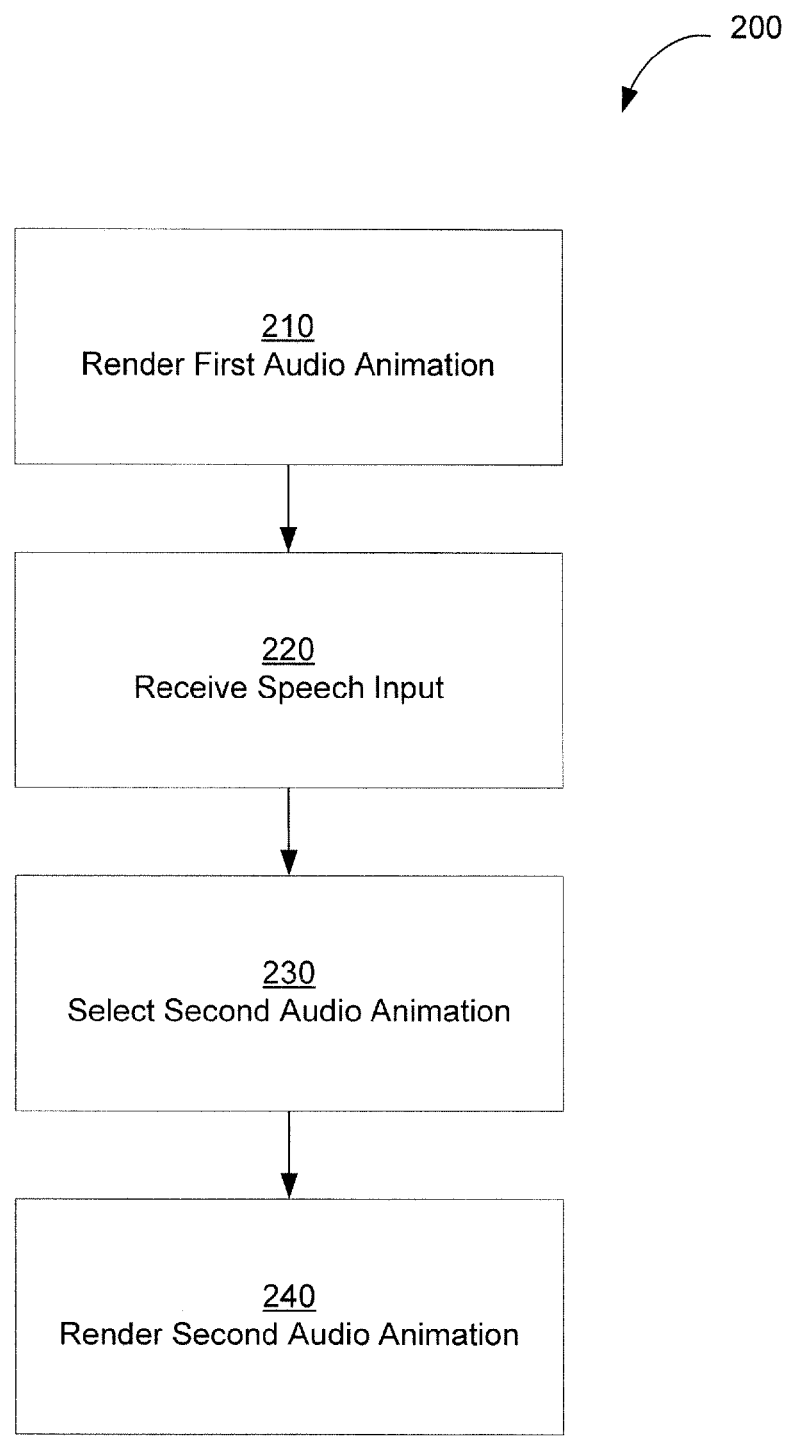
FIG. 2 shows a method of providing an audio presentation, according to some embodiments.

FIG. 2 illustrates a method of providing an audio presentation, in accordance with some embodiments. Method 200 may be performed to provide an audio presentation in a wide variety of applications that may benefit from such techniques, including, but not limited to, interactive audiobooks, interactive instruction manuals, interactive advertisements, interactive recipe books, etc. Method 200 provides an interactive audio presentation by traversing a plurality of audio animations in an order and fashion guided, at least in part, by user input which may, but need not, be in the form of speech input (e.g., speech commands). By traversing the audio animations in accordance with user input, an interactive presentation that is flexible and that feels less rigid and structured than conventional presentations may be provided, as discussed in further detail below.

In act 210, a first audio animation is rendered to the user. An audio animation typically includes a plurality of frames, each of which may include at least one audio element to be rendered. The audio animation may also include an indication of how and/or how long the audio element should be rendered. For example, the audio element may include a duration describing how long to play the audio element, or may include instruction on the number of times to repeat an audio element. The instruction or indication about how an audio element is to be rendered may depend on a number of factors, including but not limited to, the state of the audio presentation, the environment of the user, input from the user, user data and/or chance. Each frame also may include at least one gate that specifies the conditions for exiting a frame and that identifies the next frame in the audio animation to be rendered or, in some circumstances, may indicate a subsequent audio animation to traverse.

Thus, the first audio animation may be rendered by traversing the plurality of frames forming the audio animation in accordance with the specified gate criteria. Typically, at least one of the audio elements in the plurality of frames forming an audio animation includes a portion of narrative associated with the presentation that is audibly rendered to a user. For example, in the case of an interactive audiobook, the narrative may include a portion of exposition describing some aspect of the story, such as the nature of the environment and/or objects within the environment. For an interactive instruction manual, the narrative may include instruction regarding a particular aspect of assembly, or other instruction such as ingredient amounts and/or preparation instructions for an interactive recipe or cookbook. For an interactive advertisement, the narrative may include information relating to one or more products and/or services. One or more narrative portions in an audio animation may also include a prompt that requests input from the user. It should be appreciated that the audio presentation may also be actively "listening" for user input, for example, by detecting when the user has provided input via the input interface such as by detecting user speech or input from a keyboard, touchpad, etc. such that user prompting need not be part of any given animation.

As discussed above, each frame may include a gate that specifies one or more conditions under which the frame is exited and also may specify the next frame in the audio animation to be traversed. Examples of conditions that may be specified by a gate include, but are not limited to, receipt of and/or content of user input, number of user inputs received by the audio presentation, expiration of a specified time interval (either in the user's real time or artificial time of the presentation), occurrence of an event, conditions in the user's environment, chance, etc. By incorporating multiple factors into the gates within an audio animation, the level of interactivity and richness of the experience may be enhanced.

In act 220, speech input from the user associated with the presentation is received (e.g., speech input, keypad or touch input, etc.). The user input may be a command, a response to a question or query, or may itself be a question or query. As discussed above, the audio presentation may be guided, in part, by user speech input, and therefore, according to some embodiments, speech input from the user may play a role in how and in what manner or order the audio animations are presented to the user. In act 230, a second audio animation is selected for rendering based, at least in part, on the user input received from the user, and the second audio animation is then rendered to the user (act 240). By repeating the process of rendering successive audio animations based on user input, and traversing the audio animations according to the gate criteria specified in the audio animations, an interactive audio presentation may be provided to the user.

Transitions between audio animations may be rendered via a transition animation, wherein a transition animation provides a smooth shift from a first audio animation to a second audio animation. For example, where the first and second audio animations render scenes in a story presented in an interactive audiobook, upon determining that the second audio animation should be rendered, the system may fade out audio produced by the first audio animation while fading in audio produced by the second audio animation. Take, for example, an interactive audiobook having a train station scene as part of the narrative environment. The first and second audio animations may render scenes that take place in the train station, and present this environment to the user via audio. For example, ambient sounds of the train station may be audibly rendered in addition to other sounds, such as the narration of a story. When transitioning from the first audio animation to the second audio animation, it may be desirable for the ambient sounds to continue playing without any discernible audible change, such that a user would not, say, experience a moment of silence after providing speech input to move the story to a different aspect of the train station environment. Accordingly, the system may be configured to ensure that the rendering of particular audio elements continue uninterrupted when transitioning between pairs of audio animations.

As mentioned above, user input may impact the traversal of the audio animation currently being rendered. In some embodiments, this principle is used to enter a "hurry-up" mode in which alternative gate criteria are applied in order to render audio elements within the current audio animation more quickly or in an abridged manner. Hurry-up mode may be entered based on particular user input for which it is desirable to traverse an audio animation as quickly as possible while still conveying sufficient information. For example, aspects of hurry-up mode may be employed to traverse audio animations that have been previously rendered in an abridged way and/or to more quickly transition to a subsequent animation based upon receiving user input, while maintaining an intuitive or smooth transition and/or while ensuring sufficient information is conveyed to the user. Hurry-up mode may begin and end based upon user input, based upon the beginning of a new frame or new audio animation, based on a setting within a frame, element or attribute and/or on other suitable criteria.

During hurry-up mode, the system may apply different rules to handle gate criteria within the frames of the audio animation to ensure that the audio animation renders in less time than would otherwise occur. The application of gate criteria during hurry-up mode may include a consideration of the gate criteria applied when the system is not in hurry up mode. For example, a gate may comprise criteria that indicate the subsequent frame to be either a later frame in a sequence or an earlier frame in a sequence. During normal operation (i.e. while not in hurry-up mode), either frame may be the next frame selected. However, during hurry-up mode, the system may limit the choice of subsequent frames to the later frame in the sequence to ensure minimization of the time to render the audio animation. In hurry-up mode, one or more frames may be skipped, one or more animations may be skipped, and/or the duration of rendering one or more frames or one or more animations may be reduced. Other methods of rendering animations in an expedited manner may also be used, as aspects of hurry-up mode are not limited to any particular technique for advancing the presentation more quickly.

Figure 3:
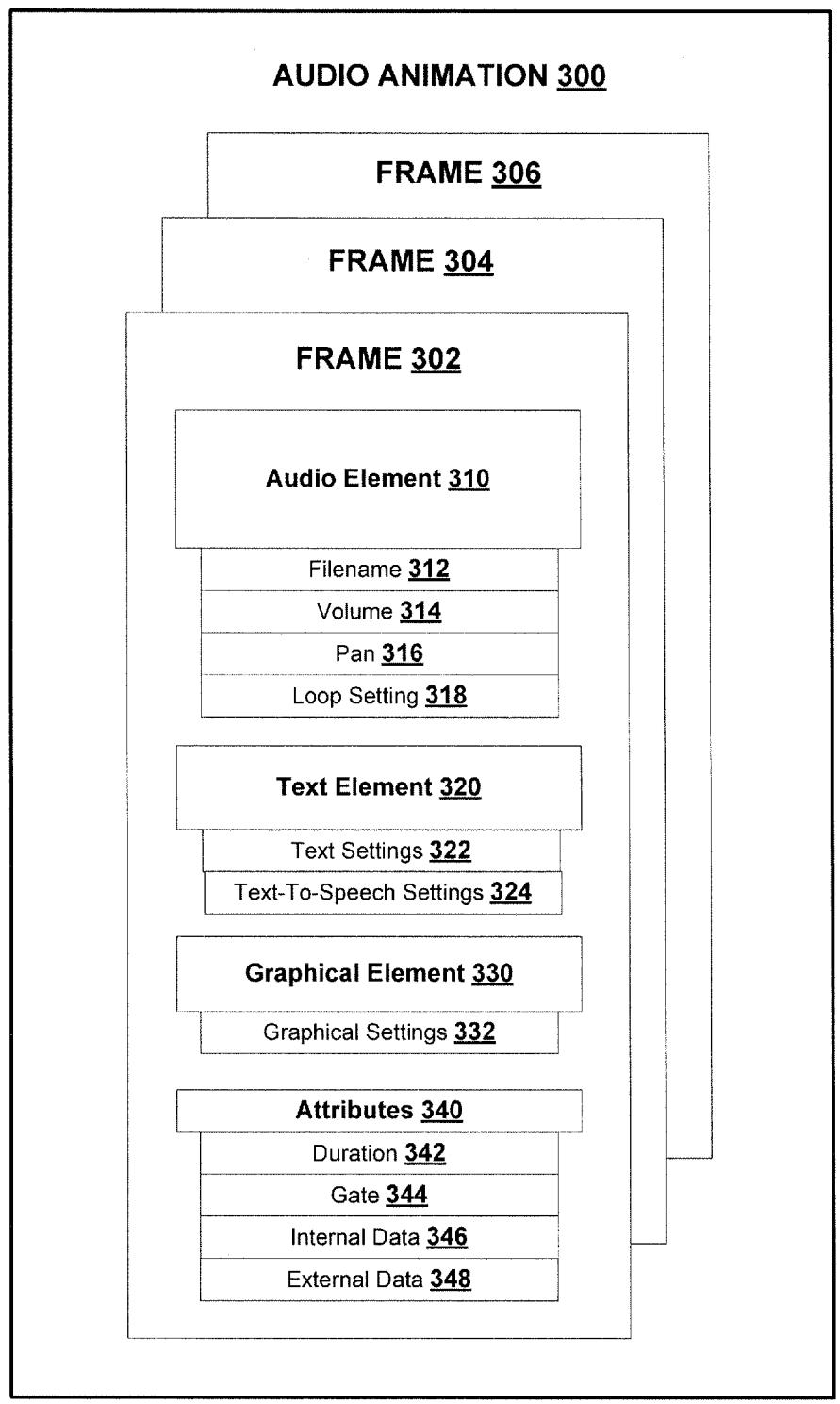
FIG. 3 is a schematic view of an exemplary audio animation comprising multiple frames, in accordance with some embodiments.

FIG. 3 depicts a schematic view of an exemplary audio animation, according to some embodiments. In this example, audio animation 300 comprises frames 302, 304 and 306. Frame 302 comprises exemplary audio element 310, text element 320, graphical element 330, and attributes 340. In general, an audio animation may contain any number of frames. Each frame may contain any number of elements, which may include one or any combination of element types shown in FIG. 3 and/or may contain other types of elements not shown in FIG. 3. A single frame may comprise multiple instances of a single element type. For instance, frame 304 may comprise two audio elements, but no text element or graphical elements.

Frame 302 comprises audio element 310. As a non-limiting example, audio element 310 may be an audio file such as an MP3, AAC, MIDI or wave file. In such cases, audio element 310 may comprise a filename 312 to locate the audio file on a storage device or at a network location. Audio element 310 may be located locally (i.e., on the device rendering the presentation) or remotely on a server accessed via the Internet, in which case filename 312 may be an Internet address or other pointer that links to the audio file. In some embodiments, audio element 310 comprises musical data to be rendered by a processor. Audio element 310 may comprise speech data describing subject matter of the animation and/or sound data related to the environment or action taking place. This audio data may be rendered to the user via an output interface. Audio elements of frames forming an animation may include any type of audio data including speech (e.g., a portion of a narrative), sounds (e.g., environmental sounds, action sounds, etc.), music, and/or other audio data.

Audio element 310 may comprise other attributes that describe the audio element, such as a duration, a file format or the name of the creator of the file. Such attributes may be stored, for example, in metadata such as an ID3 tag, or may be stored in any other suitable way. Audio element 310 may comprise one or more attributes which dictate how the audio is to be audibly rendered, such as volume 314, pan 316 and loop setting 318. Volume 314 may be used to determine a volume level at which audio element 310 is audibly rendered by a device, such as via output interface 130 shown in FIG. 1. Volume 314 may be expressed in any suitable way, including in decibels, or as a percentage of the maximum volume of the device.

Pan 316 may be used to express stereo balance of audio element 310 when it is audibly rendered. This value may be expressed in any suitable manner that allows for control over the relative volume between left and right stereo speakers. As a non-limiting example, pan 316 may have a value between −100 and +100, wherein a value of −100 results in a sound audibly rendered only through the left stereo speaker, a value of 0 results in both left and right stereo speakers audibly rendering sound at equal volumes, and a value of 100 results in right speaker rendering only. However, the pan between stereo speakers may be expressed in any suitable way, including as a variable that changes during the duration of the rendering, for example, to produce the effect of an object moving from one side of the listener to another. Audio element 310 may also have an associated loop setting 318, which expresses whether the audible rendering of audio element 310 is to be restarted upon completion, and/or that specifies a number of times the audio element should be repeated.

Frame 302 may comprise text element 320 having text to be rendered with frame 302. When frame 302 is rendered, text element 320 may be displayed as text via, for example, output interface 130 of FIG. 1. The text may be displayed in various ways, such as by having characters appears one by one on a display, or by displaying pages of text for a user to navigate through. Settings associated with the display method may be stored in text settings 322 associated with text element 320. Text elements may be rendered in association with or independent of speech, and may convey the same or different information as any associated speech, when such speech is present.

In some embodiments, text element 320 is used as input to a text-to-speech application which audibly renders the text element as synthesized speech. Settings associated with such a text-to-speech application may be stored in text-to-speech settings 324. Such settings allow for different speech presentations, such as a change in speaker, tone or cadence. For example, a frame containing a text element comprising text of an alarming nature might be synthesized to speech which communicates an urgent tone via appropriate settings in text-to-speech settings 324, or text-to-speech settings 324 may indicate the gender (or age) of the voice that should be used when synthesizing speech. In embodiments in which speech synthesis is employed, text may be rendered by displaying the text, synthesizing speech from the text, or both. Text elements may be synthesized in any suitable manner to fit the circumstances of the presentation.

Frame 302 may additionally or alternatively contain graphical element 330, which comprises graphics to be displayed to a user, for example, via output interface 130 in FIG. 1. Graphical element 330 may comprise a graphical file such as a Joint Photographics Expert Group (JPEG) file or a Portable Network Graphics (PNG) file, and/or may also comprise data files and/or instructions for rendering 2-dimensional or 3-dimensional graphics. Graphics displayed may thereby be procedurally generated using code and/or one or more graphical assets contained within graphical element 330. As non-limiting examples, the rendering of frame 302 may result in the display of a static image, video, the display of static or animated 3-dimensional objects or the display of a scrolling 2-dimensional image.

Graphical element 330 may also be associated with one or more graphical settings 332, which specify settings used to render graphical element 330 with frame 302. Such settings may allow different renderings of the same graphical data in different frames. For example, an image file may be scrolled into view when rendered in one frame, and the same image file may fade in/out of view when rendered in another frame. Graphical settings 332 may contain information on which technique to use to transition an associated graphic into view, or how fast to perform a transition.

Frame 302 may also comprise a set of attributes 340 having further information to be used when rendering frame 302. In some embodiments, attributes 340 comprise a duration 342 which specifies how long the system should render frame 302 before transitioning to another frame. Such a duration may be expressed as a length of time, for example a number of seconds, or may be expressed relative to another element of frame 302, such as when the audible rendering of audio element 310 has completed, or relative to the rendering of a subsequent frame. The duration may alternatively correspond to the occurrence of an event (e.g., the frame renders until a specified event occurs).

Attributes 340 may also comprise one or more gates 344 having one or more criteria defining when or under what circumstances a frame transition should occur. The one or more gates may also specify which frame to next traverse depending on which exit criteria have been satisfied. As discussed above, gate 344 may take one or more factors into consideration when determining when and to which frame to transition to. Gate 344 may utilize any one or a combination of duration, one or more random values, occurrence of a specified event, user input, characteristics of the current state of the presentation, user environment, whether the presentation is in hurry-up mode, etc. In some embodiments, gate 344 identifies how the transition to the next frame is to be performed, for example, by specifying how audio being rendered at a transition is to be concluded (e.g. whether audio rendered at the time of transition should be faded out, cut off, or continued).

Attributes 340 may further comprise internal data 346 and/or external data 348 specifying data from sources internal to, and external to, the system, respectively. Internal data 346 and/or external data 348 may include any data associated with the frame used to facilitate rendering of the frame, including data used by the one or more gates to determine a frame transition. It should be appreciated that internal data 346 and external data 348 may store the same type of data and differ primarily in whether the data is stored locally with the frame or at a remote location, for example, accessible over a network. A given frame may include locally stored data, while other frames may access remote data when appropriate and/or available, while some frames may not utilize either.

Frame 302 and data associated with the elements in frame 302 may be stored in any format on any suitable platform. For example, the content and data associated with frame 302 may be stored within one or more files of a suitable format, such as an eXtensible Markup Language (XML) file, including mark-ups or tags referencing content utilized by the frame (e.g. audio, text, video, etc.). Audio, text or graphical data associated with audio element 310, text element 320 or graphical element 330 respectively may be stored in any number of files and accessed in any suitable way by processor 110 when rendering frame 302. Additionally, audio animations and frames associated with a single interactive audio application may be stored at multiple locations and accessed via a combination of wired and wireless communication processes. Elements within a frame may access one or more data sources (e.g. one or more local data sources and/or one or more remote data sources such as the Internet) in the course of rendering an animation. As such, in some embodiments, a presentation is rendered in part by describing the presentation using XML, and parsing the XML document(s) using an XML parser to render the audio presentation according to the XML description, as discussed in further detail below.

It should be appreciated that frame 302 is illustrated as including a number of exemplary elements, data, settings, etc., to illustrate the variety of elements that a frame may include. However, any given frame need not (and will likely not) include each of these elements, although a given frame might. For example, a given frame may include an audio element and a gate and nothing more, or may just include an audio element, while other frames may include logic and/or may include additional elements and/or data to facilitate rendering the frame in the context of an audio animation. In this respect, an audio animation may include any number of frames of any type, each having any number and type of associated data (e.g., elements, data, settings, instructions, etc.), and an audio presentation may include any number and type of audio animations.

Figure 4:
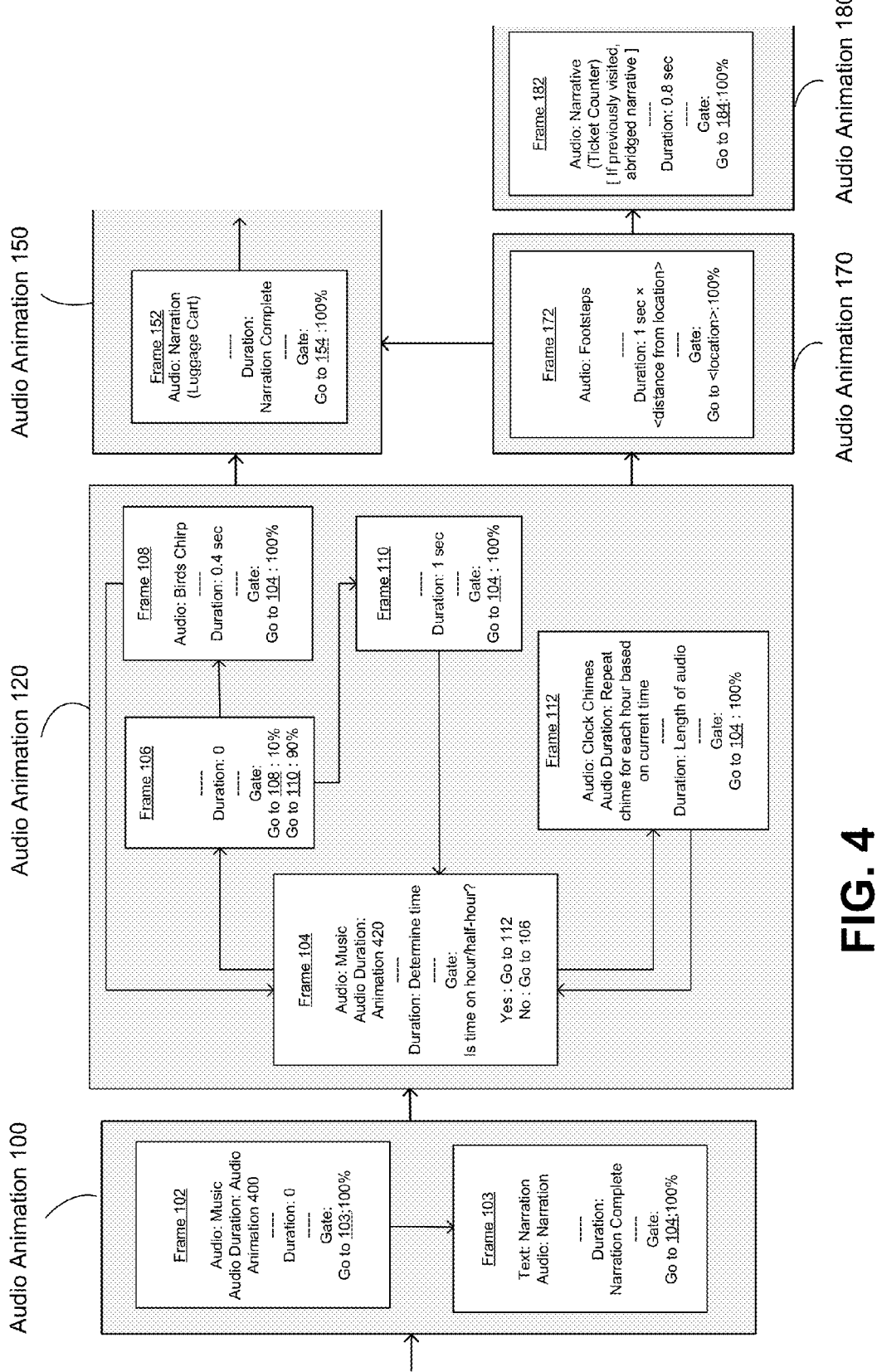
FIG. 4 is a flowchart of an exemplary sequence of audio animations and frames.

FIG. 4 illustrates a portion of an audio presentation showing exemplary audio animations, each containing one or more frames. The audio animations in FIG. 4 may, for example, render portions of an interactive audiobook to a user. Audio animation 400 includes frames 402 and 403; audio animation 420 includes frames 404, 406, 408, 410 and 412; audio animation portion 450 includes frame 452 and frame 454 (not shown); audio animation 470 includes frame 472; and audio animation 480 includes frame 482 and frame 484 (not shown). Arrowed lines between frames indicate pairs of frames where a first frame may transition to a second frame in the direction of the arrow based on criteria contained within the gate of the respective frame.

Audio animation 400 may be rendered to produce music (e.g. introductory music) and a portion of narrative to the user. For example, audio animation 400 begins by rendering frame 402 (which provides background music to be played while audio animation 400 renders) and rendering frame 403 (which includes a portion of narrative that can be rendered as audio, text or both). In some embodiments, the narration is rendered by displaying the text to the user while the text is audibly rendered to the user via a text-to-speech application. This may occur simultaneously with the presentation of background music that is audibly rendered to the user, such as that provided by frame 402. In other embodiments, the narration is rendered via audio only or text only, wherein audio renderings may be produced from a prerecorded narration or via text-to-speech synthesis.

Narration, however rendered, may describe content related to the presentation. For example, in the case of an interactive audiobook, the narrative may describe a scene in the story, or provide exposition related to the story. The narration may describe the environment, objects in the environment, or may describe the results of actions taken in response to previous user commands or instructions. As another example, when the audio presentation is an interactive instruction manual, the narrative may describe a step in a process, and/or describe portions of items or elements to which the presentation relates. The narrative may be any type of description, exposition and/or explanation pertinent to the audio presentation.

Frame 403 may include a gate that instructs an exit when the audible rendering of the narrative is completed. In this respect, the gate of frame 403 indicates that the frame should transition to frame 404 100% of the time upon completion of the narrative during normal rendering of the audio animation. If in hurry-up mode, audio animation 400 may complete after frame 403 and immediately jump to a different audio animation (not shown), as discussed in further detail below. In frame 402, the music may fade out upon transition to audio animation 420 and frame 404.

To illustrate some concepts related to rendering audio animations, the portion of an audio presentation illustrated in FIG. 4 will be described in connection with an example narrative wherein a character in an interactive audiobook is on the platform at a train station. In this exemplary context, the narrative in frame 403 may provide a description of the train station to the user such as objects on the platform (e.g., a ticket counter, a large clock, a cart with luggage, etc.). After audio animation 400 is rendered, the presentation transitions to audio animation 420 to provide environmental sounds to the user relevant to the scene described in the narrative. It should be appreciated that the train station example is merely a useful device to illustrate various aspects of audio animation and does not limit the application of these aspects to any particular type of audio presentation, as the aspects may be applied in rendering audio presentations of any type, including any of the types described herein.

In the example of FIG. 4, audio animation 420 begins by rendering frame 404, which uses time to determine when and what environmental sounds should be rendered after the narrative animation has completed. As such, frame 404 obtains the time, which may be achieved by accessing a local clock on the computer rendering the animation or by obtaining the time via a network (e.g., by accessing a location on the Internet that provides the local time), or by any other suitable means. It should be appreciated that the time obtained during the rendering of frame 404 may be an artificial time of the presentation that depends on one or more internal factors of the presentation (as discussed in further detail below), or may be the actual local time of the user. Based on the determined time, audio animation either renders a series of frames beginning with frame 406 to produce bird sounds or renders a series of frames beginning with frame 412 to produce the sound of a chiming clock.

In particular, frame 404 may be configured to transition to frame 412 to sound the clock if the time is determined to be on the hour and/or half-hour (or if the time is determined to be approximately on the hour/half-hour) and otherwise transition to frame 406 to produce randomly generated bird sounds. As such, during rendering of audio animation 420, the user will hear probabilistically generated bird sounds (as discussed in further detail below) and will hear the clock strike the hour and/or half hour during the course of rendering animation 420. Audio animation 420 may be rendered until, for example, the narrative takes the action to a different environment. Referring to the train station example, audio animation 420 may be rendered while the action takes place on the train station platform and may be terminated when the action no longer takes place in this environment, as discussed in further detail below.

As discussed above, frame 404 obtains the time (either real or artificial) to determine whether the clock should chime. If it is determined that the time is not on the hour and/or half-hour, frame 406 is rendered to generally add randomness to the audio environment of the presentation. In the example in FIG. 4, frames 406, 408 and 410 are rendered to effect birds chirping in the background. In particular, the gate criteria of frame 406 is such that 10% of the time, frame 408 is rendered next, and 90% of the time, frame 410 is rendered next. When frame 408 is rendered, an audio element comprising the sound of birds chirping is audibly rendered to the user for some desired length of time (e.g., 0.4 seconds). On completion of frame 408, the animation returns to frame 404 to again determine the time. When frame 410 is rendered, no text or audio element is presented, and after a predetermined duration has elapsed, frame 404 may again be rendered to determine the time and proceed accordingly. For example, frame 404 may include some desired pause before again obtaining the time to determine whether it is time to chime the clock.

While frames 406, 408 and 410 are shown as separate frames, they may include any number of frames. For example, this series of frames may logically be a single frame including the audio element and logic that renders the audio element some percentage of the time and does nothing some other percentage of the time. This construct, however many frames are used, may be applied to render any type of sound to facilitate audio when it is desired to render sound in a non-deterministic manner. Other factors besides probability may also be used to affect a generally random rendering of one or more audio elements, as the aspects are not limited in this respect.

If, when rendering frame 404, it is determined that the current time is on the hour and/or half hour (or suitably close), audio animation 420 will render frame 412. Frame 412 illustrates a way in which audio related to the environment may be rendered. In this example, the clock may chime a number of times corresponding to the time of day (e.g., chime once at 1 pm, twice at 2 pm, etc.), and the half-hour chime may be a different chime or chime sequence, for example. In some embodiments, the chiming of the clock may play into the narrative by alerting the player to the time in connection with an expected train, or may be used simply to enrich the environment and draw upon actual (or artificial) time to enrich the experience.

In the example in FIG. 4, animation 420 uses time to determine what environmental sounds should be rendered, and in the particular example illustrated, determines how and when to render chirping birds and/or the chiming of a clock. As should be appreciated, this construct may be used to render any number of environmental sounds (e.g., the probability based construct may be used to render voices on the platform, or the time may be utilized to play an audio element of an announcer reporting the arrival of a train over a public announcement (PA) system, or whatever sounds are appropriate for a particular environment or pertinent to the narrative being told) to add time-based elements to the audio presentation.

As discussed above, the time obtained by frame 404 may be actual time or artificial time, or a combination of both. For example, in addition to, or as an alternative to using the user's time, an audio animation may select frames to render and/or may choose to transition to a subsequent animation based on some measure of artificial time such as a clock that tracks how long a frame, audio animation and/or the presentation has been rendering and progresses the presentation based on this "presentation" time. The number of user inputs may also be used as a measure of artificial time and may be exploited to advance or guide the audio presentation in a particular way. In the train station example, the audio presentation may be configured to transition to an audio animation that renders the approach and arrival of a train at the station (e.g., by rendering a frame including an audio element that sounds a train whistle and/or is accompanied by other locomotive sounds and that begins a train arrival sequence of frames/animations) after a predetermined number of user inputs/commands. Thus, the user interacting with the audio presentation may be used to mark time and advance/guide the progress of the audio presentation.

Audio animation 420 may continue to be rendered until, for example, input received from a user associated with the interactive audiobook presentation changes the context such that animation 420 is no longer relevant and/or necessary. User input may be received at any time during the rendering of audio animation 420, and based on the user input, any one of a number of different audio animations may be rendered, either alone or in combination with rendering other audio animations (e.g., audio animation 420 may continue to be rendered while the user remains on the platform, either by continually rendering the animation or by pausing while another animation is rendered and returning to animation 420 when a subsequent animation completes, provided the action remains in a context where animation 420 is relevant and/or appropriate).

In FIG. 4, a number of exemplary animations are illustrated that may be rendered based on input from the user. For example, audio animation 470 may be rendered to play the sound of footsteps as the character in the narrative walks over to a new location in response to a user command. Audio animation 470 may take as an input a distance parameter based on the current location of the character and the location to which the user commanded the character to go. Based on this distance parameter, audio animation 470 may render footsteps for a duration that depends on the distance the character in the narrative is instructed to walk. The footsteps animation can be used any time is desirable to sound the characters footsteps moving from one location to another. Multiple audio animations comprising frames which render the sound of footsteps on various different surfaces may be included. For example, one audio animation may render footsteps on pavement and another may render the sound of feet walking up steps, over a natural surface or any other effect. The system may render one of these audio animations depending on the desired effect in the story, and may use information about one or more story locations, including the present location in the story and the new location chosen in response to a user command, to determine which footsteps audio element to render.

The presentation may proceed from animation 470 to another animation depending on where the user command directed the character to go. For example, the user may speak the command "approach ticket counter" and, after rendering the footsteps animation, the presentation may render frame 482 of audio animation 480, which may include a narrative describing the ticket counter and anything of interest in connection with the ticket counter. Frame 482 may also include logic that determines whether the character has been at the ticket booth before and, if so, play an abridged narrative that, for example, simply notifies the user that the character is in front of the ticket booth without again providing the detailed description in this respect.

As another example, the user may speak the command "examine luggage" while standing next to the luggage cart. Since the character is already at the luggage cart, audio animation 470 may be skipped and animation 450 rendered to provide a narrative description of the luggage on the cart and items of interest thereabouts. While animation 450 (or animations 470, 480, etc.) are being rendered, animation 420 may be simultaneously rendered to continue generating environmental sounds. Alternatively, animation 420 may be exited to render any of animations 470, 480 or 450 and rendered again after the respective animations complete so that animation 420 remains part of the sequence while the character is located in the corresponding environment. In this respect, audio animation 420 may function as an idle animation that is rendered when in the appropriate environment when no other animation is active or in the rendering queue, as discussed in further detail below.

In some embodiments, frames may contain an internal variable which instructs the system not to accept user input while the frame is being rendered. This may be desirable to ensure that user input cannot interrupt certain frames being rendered, which might lead to a user missing part of the presentation considered important or critical, for example. Furthermore, as described above, user input or other variables may lead to one or more animations being rendered in hurry-up mode. In hurry-up mode, certain animations or certain frames within an animation may be intelligently skipped to take the user to the appropriate portion of the presentation, while removing unnecessary frames or animations.

It should be appreciated that the frame and animation sequences illustrated in FIG. 4 are merely exemplary and are provided to illustrate some concepts related to providing an audio presentation. The techniques described herein facilitate animating a collection of audio elements to provide a desired presentation. Some benefit of techniques described herein derive from the inventor's appreciation that a collection of audio elements can provide the pieces of the presentation and that relatively simple logic can then be used to animate the audio elements by traversing the audio elements in accordance with the various techniques described herein. In some embodiments, the logic that determines the traversal of the audio elements and audio animations is described using XML, and implemented using an XML parser, or using any structured or mark-up language that can be interpreted and rendered using an associated parser/interpreter, as discussed in further detail below.

Audio animations can be grouped into an environment containing the audio elements present in and/or describing the environment. The audio animations may be bound into the environment using logic needed to traverse the audio elements based, at least in part, on user interactivity. As an example, an environment that includes a locked door that can be opened by a key may include uniquely named animations that include audio elements for the sound of a locked door, the sound of a key turning in a lock, the sound of a door being opened, the sound of a door being closed, etc.

Animations including these audio elements, may be rendered (or not rendered) depending on input from the user. An environment may also include an idle animation that is rendered when no other animation is playing (e.g., when the presentation is idle waiting for user input and no other animations are active or queued up for rendering). For example, animation 420 in FIG. 4 may be used as an idle animation for the example train station platform environment to render appropriate environmental sounds. In one aspect, an audio animation may be envisioned as an audio state machine that transitions between audio segments according to designated criteria.

An audio presentation may move from one environment to another using one or more transition animations that facilitate smooth transitions between environments. For example, a transition animation may include one or more audio elements and/or narrative portions providing information to the user about the environment being transitioned to and/or concluding information about the environment being exited. The one or more transition animations may also queue the initial animation(s) to be rendered in the new environment.

Figure 5A:
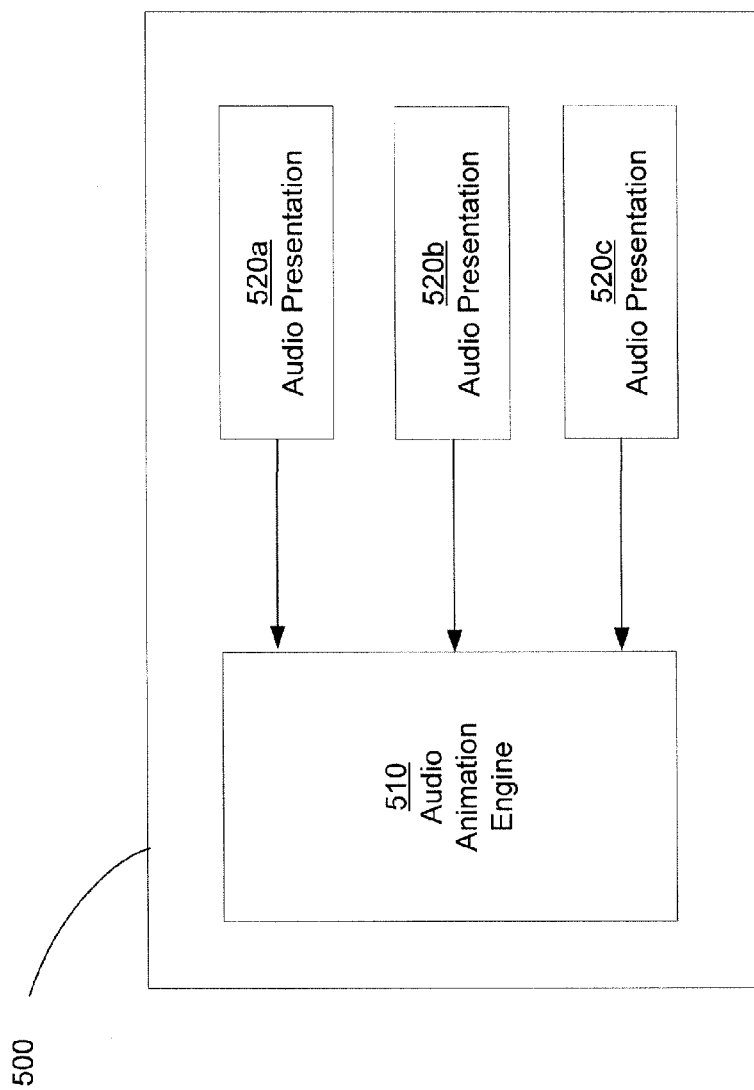
FIG. 5A is a schematic view of an exemplary implementation of an interactive audio presentation, in accordance with some embodiments.

FIG. 5A illustrates an exemplary system capable of implementing an interactive audio presentation, in accordance with some embodiments. In FIG. 5A, system 500 comprises an audio animation engine 510 that is capable of rendering audio presentations described as structured documents (e.g., audio presentations 520a-520c described using a mark-up language). In particular, audio animation engine 510 comprises an interpreter of the structured document that plays back the audio animations as instructed by the structured document in connection with input from the user. Audio animation engine 510 therefore does not need to know about the content or nature of a particular audio presentation. Instead, audio animation engine 510 need only know how to interpret the structured documents (e.g., written using a mark-up language or other structured for formatted language) to play the animations in the sequence described by the structured document. As such, any audio presentation written in a format capable of being interpreted/parsed by the engine can be rendered by audio animation engine 510.

In some embodiments, the structured documents are XML documents and audio animation engine 510 includes an XML interpreter. In such embodiments, audio animation engine 510 parses the XML document and places animations in a playback queue for rendering in accordance with the traversal logic specified in the XML document. That is, the XML document may specify which animations to play and in what order. The audio animation engine 510 may queue up the appropriate animations and play back the audio files specified by the animations in accordance with information stored in the corresponding frames (e.g., volume, pan, speed, duration, etc. described in the structured document). Audio animation engine 510, may queue animations based, at least in part, on user input. When a user provides input (e.g., a spoken command), one or more animations specified in the XML document are queued for playback in response to taking the action indicated by the user. Thus, audio animation engine 510 plays audio elements (and/or renders text and/or graphics) in a sequence and manner instructed by the structured document.

According to some embodiments, when an animation is being rendered and another animation is requested (e.g., a user provides input during rendering of an animation the result of which requires the rendering of a different animation), the currently playing animation is rendered in "hurry-up" mode. In "hurry-up" mode, the audio animation engine follows exit branching specified in the animation that advances the animation in a more expedient manner than if the animation were to be rendered when operating in a normal mode. Hurry-up mode may allow for intelligent playback to handle circumstances where user input takes the action in a particular direction during the playback of a given animation.

It should be appreciated that XML is an example of a structured format that may be used to author audio presentations. Audio presentations may be authored using any format provided there is an interpreter that can parse the corresponding format to render animations in the order and manner specified in the structured document, and techniques described herein are not limited to any particular type of authoring format, structure or language. However, XML generally provides a well-known and well defined structure and format that may facilitate the generation of audio presentations and facilitate a general purpose animation engine to render such presentations.

According to some embodiments, audio animation engine 510 includes automatic speech recognition (ASR) capabilities that allow the user to interact with an audio presentation using speech. For example, ASR capabilities may allow the user to guide the rendering of the presentation using speech input, and more particularly, by providing speech commands to the audio animation engine. ASR may have natural language understanding capabilities to recognize and understand user commands and respond accordingly (e.g., by queuing up the appropriate animations for playback). According to some embodiments, different audio presentations may include a corresponding command vocabulary and/or command grammar that defines the set of commands that can be used by the user when interacting with the respective audio presentation.

Alternatively, or in addition to, the audio animation engine may have access to one or more vocabularies, grammars, language models, etc., that can be used to recognize user speech. These speech recognition resources may be supplemented by vocabularies, grammars and/or language models, for example, provided by the author of a presentation to extend the ASR capabilities of the audio animation engine. It should be appreciated that any suitable ASR functionality may be used, as such aspects are not limited for use with any particular type of ASR, or limited to any particular ASR technique or functionality.

Audio animation engine 510 may also include text-to-speech synthesis (TTS) capabilities to render text as audio. As discussed above, audio portions of speech (e.g., narrative portions of an interactive audiobook, or instruction portions of an interactive manual or recipe book) may either be rendered as pre-recorded audio or converted to audio from text. To accommodate audio presentations that store speech segments as text, audio animation engine 510 may include a TTS engine to convert the text to audio to be rendered to the user. The TTS capabilities may include functionality to render text as audio in a single voice or in multiple voices and/or to render text as audio according to emotional cues provided in the text, such as via mark-ups, emoticons, etc. Any suitable TTS functionality may be used, as such aspects are not limited for use with any particular type of TTS.

FIG. 5B illustrates using a structured format to describe an audio presentation, which may then be rendered using an interpreter or parser (e.g., for example the audio animation engine 510 illustrated in FIG. 5A). According to some embodiments, audio animations and frames may be described as a series of nested tags, and frame attributes may be specified via attributes. As noted above, it will be appreciated that frames and data associated with the elements specified by the frames may be stored in any format on any suitable platform.

FIG. 5B shows a section of a structured file as an example, and does not limit the format of data files which may be used to practice techniques described herein. The structured document in FIG. 5B may, for example be an XML document or may be some other suitable structured format for which an interpreter may be developed. Non-limiting examples of structured formats include YAML, JavaScript Object Notation (JSON) and Comma Separated Values (CSV), although any other data formats capable of being interpreted by a suitable parser may be used.

In the example of FIG. 5B, section 550 of a structured document shows a description of an audio animation. The contents of the audio animation data section 552 may describe, at least in part, audio animation 400, and the contents of audio animation data section portion 553 may describe, at least in part, a portion of audio animation 420 illustrated in FIG. 4. Furthermore, in this example, frame 402 may be described, at least in part, by the content inside frame data section 560 and frame 403 may be described, at least in part, by the content inside frame data section 561. In FIG. 5B, the remainder of audio animation data section 553 is not shown, but may describe, for example, the remainder of audio animation 420.

Frame data section 560 comprises content data section 562 and gate logic data section 563. The content data section 562 comprises audio element 564, which contains values for volume, pan, loop and filename attributes, (e.g., as described above in the discussion of FIG. 3). In the example of FIG. 5B, audio element 564 would, when the audio animation and frame represented by audio animation data section 552 and frame data section 560 are rendered (e.g., by an audio animation engine parsing the structured document and playing the animations accordingly), cause the audio file "Intro_Music.mp3" to be audibly rendered at 20% volume, at equal volume in left and right stereo speakers, and play again from the start once the audio file has completed playing (the latter due to the loop="Y" setting). Therefore, the audio produced by rendering the audio file would continue to play at a low volume, which may, for example, be used as background music while corresponding narration plays (e.g., as discussed in the example presentation in FIG. 4).

Frame data section 560 also comprises gate logic data section 563, which in turn comprises a gate logic data element 565 that indicates a gate specifying the transition to another frame. When the frame represented by frame data section 560 is completed, as determined by the duration attribute of "0" associated with frame data section 560, the gate data section determines which frame will be rendered next. In the frames illustrated in FIG. 5B, the duration is expressed in units of milliseconds, but any suitable unit may be used. Gate logic data element 565 has a type attribute of "termination," denoting that the frame should continue playing the audio element until the frame is terminated. In the example of FIG. 5B, frames are simply numbered sequentially as they appear in the audio animation data section, though in practice any suitable method for identifying frames may be used, including by storing a name string or unique identifier with each frame data section that may be used to identify other frame data sections. When the frame described by frame data section 560 is rendered, therefore, audio stored in the file Intro_Music.mp3 will continuously loop until the animation represented by audio animation data section 552 completes. The style tag indicates that, upon termination, the audio should exit by fading out.

Frame data section 561 contains content data section 566 and gate logic data section 567, and is configured with a duration of "/Content/Audio/1" which indicates that the duration is to be set equal to the duration of the first 'Audio' element of the 'Content' section. In other words, this duration will ensure that the frame represented by frame data section 560 will be rendered so long as the referenced audio file is being played. The indicated audio file referenced by audio element 568 represents a narration, which may be, for example, the narration of a story to be rendered at 100% volume (due to the attribute 'volume="100"' in audio element 568) while the background music rendered by audio element 564 plays at a lower volume. Gate logic data element 569 indicates that, when frame data section 561 has completed rendering, frame 3 will be the next frame to render, which is illustrated in FIG. 5B by frame data section 570. The net effect of audio animation 552 is therefore that an audio narration plays over background music until the narration ends, at which time frame data section 570 is rendered. The background music will continue to play until the audio animation 552 ends, at which time the background music will stop due to the gate logic type of "termination" set in gate logic data element 565.

Audio animation data section 553 describes a portion of audio animation 420 shown in FIG. 4, wherein frame data section 570 describes frame 404. Audio animation data section 553 comprises frame data section 570, which contains gate data section 572 and gate logic data elements 574, 576, 578 and 580. The gate logic data elements each have a type attribute of "time_past_hour" that express a method of determining the next frame based on the time past the current hour, and each expresses an upper and lower bound on that time. In the example of FIG. 5B, the first gate logic data element in which the time is found to lie between the upper and lower bound will be used to determine the next frame to be rendered. In this example, time is expressed as the number of seconds since the hour, but in general any way of expressing the time may be used.

Consequently, the $7^{th}$ frame described in the structured document will be rendered after frame 570 finishes rendering when the time is between 0 and 5 seconds past the hour, the $4^{th}$ frame described in the structured document will be rendered after frame 570 finishes rendering when the time is between 6 and 1799 seconds past the hour, etc. The effect presented by gate logic data elements 574, 576, 578 and 580, therefore, is that after frame 570 finishes rendering, the $7^{th}$ frame, which may render sound of a clock chiming, will be rendered when the time is approximately on the hour or on the half hour, and that the $4^{th}$ frame will be rendered otherwise.

The above description is provided purely to illustrate an example technique for providing a structured document that describes animations that may be parsed and played back by an audio animation engine (e.g. audio animation engine 510 shown in FIG. 5A) so that the audio animations can be rendered according to the description provided in the structured document. As described above, any suitable structured document capable of being interpreted to produce one or more audio animations may be used.

As discussed above (e.g., in connection with FIG. 1) an audio animation engine may be implemented on any suitable computing device, such as on a computer, a television, or a mobile device (e.g., a smart phone). FIG. 6 depicts a mobile device capable of rendering an interactive audio presentation. Mobile device 600 comprises an output interface including display 610 and/or audio device 620 (e.g. one or more speakers). In some embodiments, audio output may be provided from an audio device not enclosed within the mobile device; for example, from a headset or hands-free device either physically connected to the mobile device, or connected wirelessly using a wireless communication protocol, such as Bluetooth™.

Mobile device 600 comprises an input interface including receiver 630 configured to receive speech input from a user 605 (e.g., one or more microphones). In some embodiments, speech input may be received from a receiver not enclosed within the mobile device; for example, from a headset or hands-free device either physically connected to the mobile device, or connected wirelessly using a wireless communication protocol, such as Bluetooth™.

In some embodiments, mobile device 600 is capable of communicating over a network 650 (e.g., the Internet) via a wired or wireless connection. Mobile device 600 may additionally comprise internal memory which stores one or more of user data, application data, a text-to-speech system and/or an automatic speech recognition system. One or more audio presentations may be stored within the mobile device's internal memory, or may be located at a network or Internet location accessed via the mobile device's wireless communication system. Mobile device 600 may have installed thereon an audio animation engine configured to render the one or more audio presentations stored locally and/or capable of being accessed over a network.

According to some embodiments, display 610 includes a touchscreen device. User input via a touchscreen device may be used instead of, or to supplement, user speech input to the interactive audio presentation being executed. Touch input from a user may allow the user to interact with a presentation, for example, by allowing the user to touch text elements and/or graphical elements rendered on the display. For example, a graphical element may represent an object in a scene, and touch input may be applied to manipulate the object in some way, for example, to indicate that some action should be taken in connection with the object. Accordingly, touch input may be used to guide a presentation by determining which animation and/or frame to render next. As such, a touch display may add another layer of user interactivity with an audio presentation.

Figure 7:
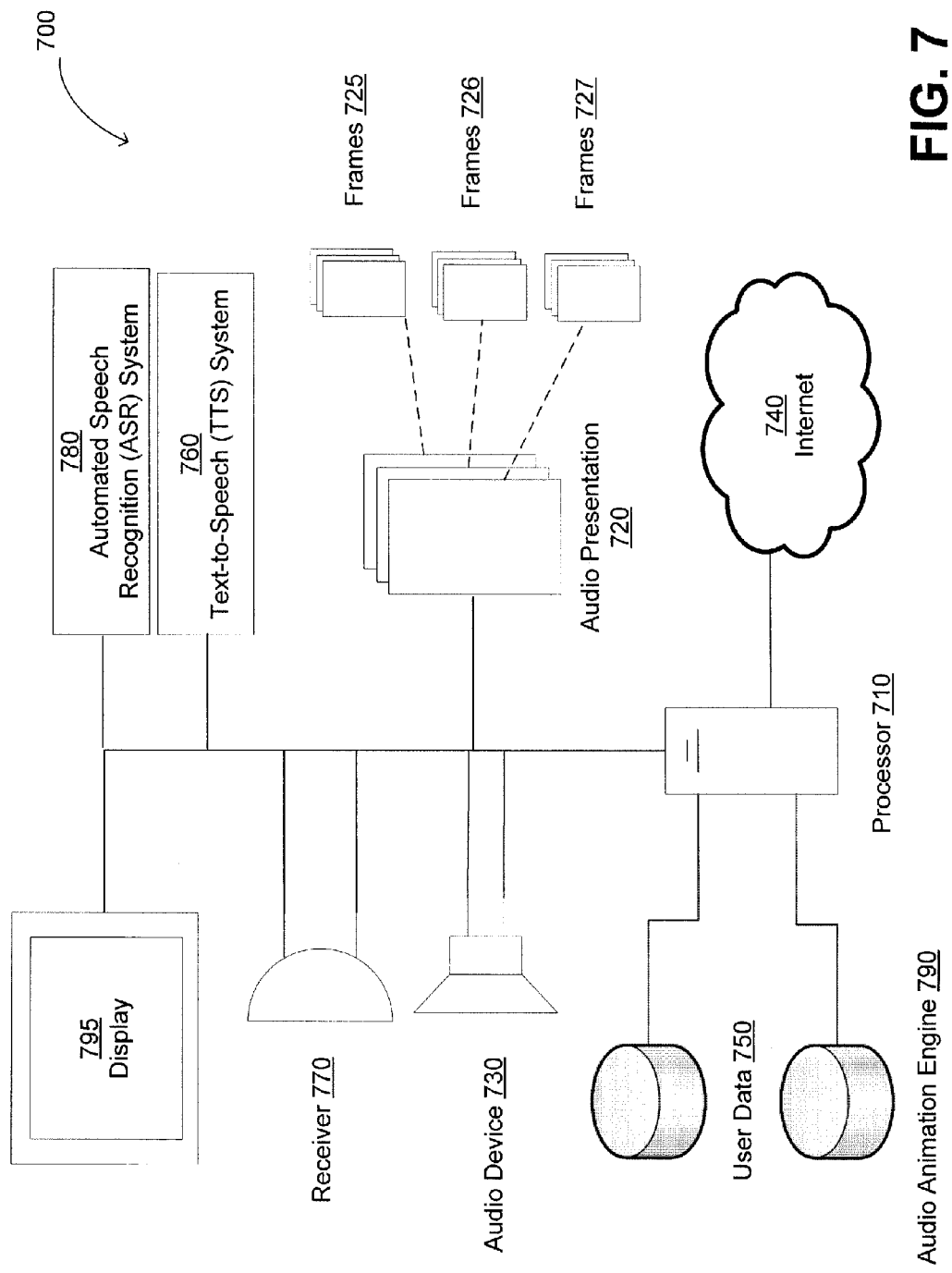
FIG. 7 is a schematic view of a system suitable for practicing some embodiments described herein.

FIG. 7 depicts system 700 on which audio presentation techniques may be implemented. In system 700, processor 710 is capable of accessing an audio presentation 720 including a plurality of audio animations. Processor 710 may be configured to render audio presentation 720, for example, by executing an audio animation engine configured to interpret and animate the audio presentation (e.g., an audio animation engine described in connection with FIG. 5A).

In some embodiments, processor 710 is coupled to an audio device 730 which outputs audio generated by rendering audio presentation 720. In the example of FIG. 7, processor 710 may render the audio presentation using data associated with the audio presentation being rendered. Audio device 730 may be a device that is capable of playing multiple sources of audio simultaneously.

In some embodiments, processor 710 is coupled to the Internet 740 to obtain data which may be used to facilitate rendering an audio presentation. For example, an audio presentation may include certain audio elements that are played based upon the weather at system 700's location, such as sounds of rain during a storm, or birdsong during sunny weather. Data obtained via an Internet query, e.g., via a web service, may be used to ascertain the weather at system 700's location and this data may be then used when rendering the audio animation to play the appropriate weather-related sound. Other examples of Internet data that may be used are the current date, the current time, local events, etc. The Internet may also provide audio data, such as sound effects or streaming audio, to be rendered as part of an audio presentation.

Processor 710 may also be coupled to a source of user data 750, which may additionally be used when rendering an audio presentation. User data may comprise, for example, an individual's name, state data from a previous session of using system 700, or an indication of how frequently the user accesses the system. This may allow audio animations to contain personalized greetings or messages to users of the system. For example, in embodiments in which system 700 provides an audiobook, user data 750 may allow the system to audibly render a voice saying: "Welcome back, Robby! Shall we resume where we left off?"

In some embodiments, the audible rendering of a voice may be provided by text-to-speech (TTS) system 760. The TTS system 760 may be any suitable system which translates text into audible speech utterances of the words represented by the text. The audible speech utterances may be output by audio device 730. The text provided as input to the TTS system may be provided by at least one or more of: data contained within an audio animation or frame (e.g., the text of a narrative in an audiobook, or description of assembly in a user's manual, etc.), data obtained from the Internet, or user data. For example, an audio animation may be rendered via TTS system 760 utilizing data from the Internet 740 and user data 750, to result in the audible rendering of the utterance: "Good morning, Robby. It sure is rainy today!" In this example, the time of day ("morning") and the weather ("rainy") may be obtained from the Internet 740 and the user's name ("Robby") may be obtained from user data 750.

In some embodiments, TTS system 760 is separate from audio animation engine 790, and may be stored either locally or remotely (e.g., stored remotely and accessible over a network). In such embodiments, audio animation engine 790 may provide text to TTS system 760 and receive speech back from TTS system 760 corresponding to the text input. In some embodiments, TTS system 760 is part of audio animation engine 790 as an integrated program or set of programs.

As discussed above, an audio presentation may be guided by speech input (e.g., speech commands and/or questions spoken by the user). In such embodiments, receiver 770 may receive audio signals from the user's voice and provide audio data to automated speech recognition (ASR) system 780. Data obtained from the speech recognition process may be provided to processor 710 to determine how the user's speech should impact the rendering of an audio presentation (e.g., to determine which audio animation is to be rendered next). In some embodiments, the ASR system is a separate system from audio animation engine 790, located either locally or remotely, that converts speech to text and provides the resulting text to audio animation 790 to determine the manner in which the audio presentation should be rendered, based on the speech input. According to some embodiments, ASR system 780 is part of the audio animation engine 790 as an integrated program or set of programs.

In some embodiments, the system includes a display 795 which may graphically render data, such as text or graphics. For example, text contained within a frame may be shown on the display. In some embodiments, text that is audibly rendered to a user via TTS system 760 is also shown on display 795. One or more graphical elements, may also be shown on display 795 as part of rendering one or more audio animations. Such graphical elements may be image files, video files, or may be instructions to render 2-dimensional or 3-dimensional graphics on display 795.

In some embodiments, audio presentation 720 corresponds to an interactive audiobook such that, when executed by system 700, provides an interactive fiction experience to the user. In some embodiments, audio presentation 720 executed by system 700 may render an interactive user guide or troubleshooting guide for a product. This may allow a user to ask questions about a product or provide troubleshooting information and have the application respond based on the user input. For example, during installation of electronic equipment, system 700 may execute an audio presentation to audibly render audio animations providing guidance on installation and may additionally provide installation figures via display 795. The execution of an audio presentation by system 700 may result in audibly rendering another audio animation based on voice input from a user. Such audio animations may provide, for example, troubleshooting information, the next step in the installation process, or may repeat an already-presented audio animation.

Figure 8:
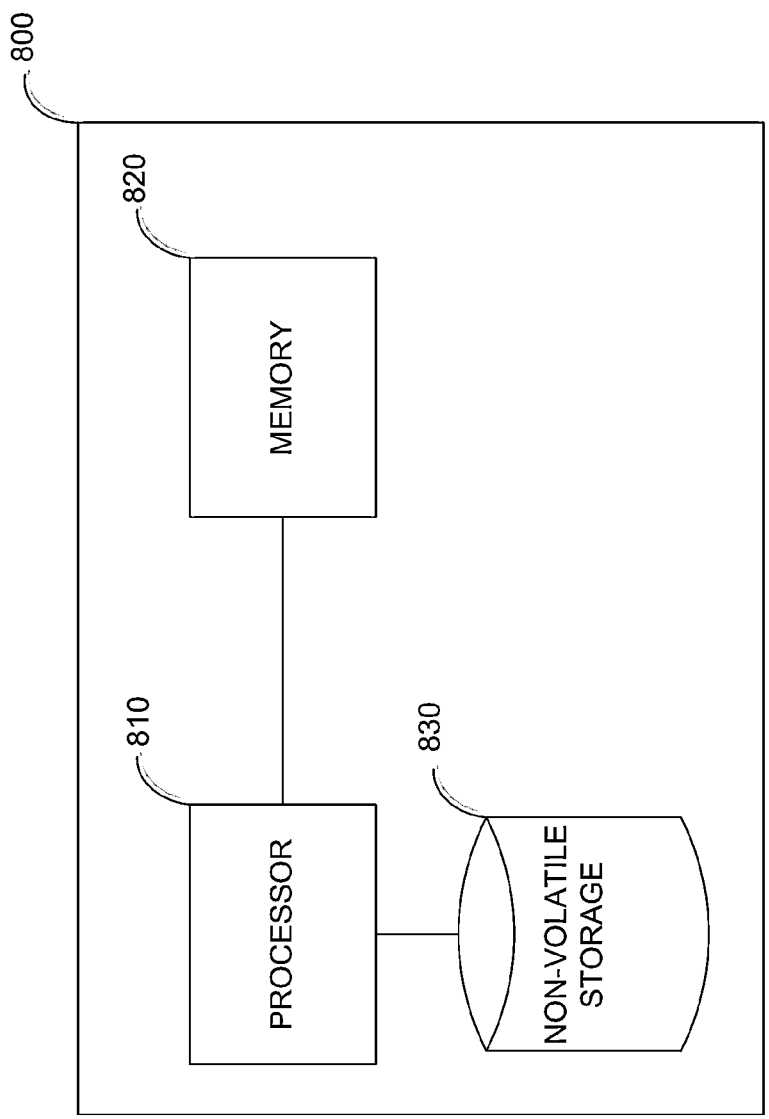
FIG. 8 is a schematic view of a computer system on which techniques described herein may be implemented.

An illustrative implementation of a computer system 800 that may be used to implement one or more of the audio animation techniques described herein is shown in FIG. 8. The computer system 800 may include one or more processors 810 and one or more non-transitory computer-readable storage media (e.g., memory 820 and one or more non-volatile storage media 830). The processor 810 may control writing data to and reading data from the memory 820 and the non-volatile storage device 830 in any suitable manner, as the aspects of the invention described herein are not limited in this respect. To perform functionality and/or techniques described herein, the processor 810 may execute one or more instructions stored in one or more computer-readable storage media (e.g., the memory 820, storage media, etc.), which may serve as non-transitory computer-readable storage media storing instructions for execution by the processor 810.

In connection with the audio presentation techniques described herein, one or more audio presentations may be stored on one or more computer-readable storage media of computer system 800. In addition, an audio presentation interpreter or parser (e.g., and audio animation engine) may also be stored on computer system 800. Processor 810 may execute the audio presentation interpreter/parser to operate on the audio presentation such that the audio presentation may be rendered to a user. Any other software, programs or instructions described herein (e.g., ASR and/or TTS capabilities) may also be stored and executed by computer system 800.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of providing an interactive audio presentation, at least in part, by rendering a plurality of audio animations, each audio animation comprising a plurality of frames, the method comprising:
rendering, via at least one audio device, a first audio animation comprising a first plurality of frames, each of the first plurality of frames comprising a duration, at least one audio element, and at least one gate indicating criteria for identification of and transitioning to a subsequent frame and/or a subsequent animation, wherein at least one of the first plurality of frames includes, as the respective at least one audio element, a portion of narrative associated with the presentation that is audibly rendered to a user, and wherein rendering the first audio animation comprises traversing the first plurality of frames at least by:
audibly rendering the respective at least one audio element in a first frame of the first plurality of frames;
identifying and transitioning to a second frame of the first plurality of frames according to the respective at least one gate of the first frame;
and while audibly rendering the respective at least one audio element in the first frame, simultaneously audibly rendering the respective at least one audio element in the second frame of the first plurality of frames;
receiving, via at least one input device, input from the user, the input being associated with the presentation;
selecting a second audio animation based, at least in part, on the input, the second audio animation comprising a second plurality of frames, each of the second plurality of frames comprising a duration, at least one audio element, and at least one gate indicating criteria for identification of and transitioning to a subsequent frame and/or a subsequent animation; and
rendering, via the at least one audio device, the second audio animation by traversing the second plurality of frames in accordance with each respective at least one gate;
wherein the respective at least one gate of at least one of the first plurality of frames indicates criteria for transitioning to and identification of a subsequent frame according to one or more probabilities.

2. The method of claim 1, wherein the input from the user includes a speech input.

3. The method of claim 2, wherein the speech input is processed by automatic speech recognition (ASR) to provide recognized text.

4. The method of claim 3, wherein the recognized text is analyzed to understand a meaning of the speech input to guide, at least in part, the selecting of the second audio animation.

5. The method of claim 1, wherein the first audio animation and the second audio animation are described using a structured format, each respective description including, for each of the first plurality of frames in the first audio animation and for each of the second plurality of frames in the second audio animation, respectively, a reference to the respective at least one audio element, one or more parameters for rendering the respective at least one audio element, and a specification of the criteria for exiting the respective frame and/or audio animation.

6. The method of claim 5, wherein rendering the first audio animation and the second audio animation comprises parsing the respective description of the first audio animation and the second audio animation and playing back the respective at least one audio element in accordance with the corresponding description.

7. The method of claim 5, wherein the structured format includes extended mark-up language (XML).

8. The method of claim 1, wherein at least one portion of narrative is speech generated by a text-to-speech (TTS) application.

9. The method of claim 1, wherein the respective at least one gate of at least one of the first plurality of frames indicates criteria for transitioning to and identification of a subsequent frame that includes a random or pseudorandom value.

10. The method of claim 1, wherein the interactive audio presentation, when rendered, presents an interactive fiction presentation to the user.

11. The method of claim 1, wherein the interactive audio presentation, when rendered, presents an instructional presentation to the user.

12. The method of claim 1, wherein the interactive audio presentation, when rendered, presents an interactive advertisement to the user.

13. At least one non-transitory computer readable medium storing instructions that, when executed by at least one processor, performs a method of providing an interactive audio presentation, at least in part, by rendering a plurality of audio animations, each audio animation comprising a plurality of frames, the method comprising:
rendering a first audio animation comprising a first plurality of frames, each of the first plurality of frames comprising a duration, at least one audio element, and at least one gate indicating criteria for identification of and transitioning to a subsequent frame and/or a subsequent animation, wherein at least one of the first plurality of frames includes, as the respective at least one audio element, a portion of narrative associated with the presentation that is audibly rendered to a user, and wherein rendering the first audio animation comprises traversing the first plurality of frames at least in part by:
audibly rendering the respective at least one audio element in a first frame of the first plurality of frames;

identifying and transitioning to a second frame of the first plurality of frames according to the respective at least one gate of the first frame; and while audibly rendering the respective at least one audio element in the first frame, simultaneously audibly rendering the respective at least one audio element in the second frame of the first plurality of frames;

receiving input from the user associated with the presentation;

selecting a second audio animation based, at least in part, on the input, the second audio animation comprising a second plurality of frames, each of the second plurality of frames comprising a duration, at least one audio element, and at least one gate indicating criteria for identification of and transitioning to a subsequent frame and/or a subsequent animation;

and rendering the second audio animation by traversing the second plurality of frames in accordance with each respective at least one gate;

wherein the respective at least one gate of at least one of the first plurality of frames indicates criteria for transitioning to and identification of a subsequent frame according to one or more probabilities.

14. The at least one non-transitory computer readable medium of claim 13, wherein the input from the user includes a speech input.

15. The at least one non-transitory computer readable medium of claim 14, wherein the speech input is processed by automatic speech recognition (ASR) to provide recognized text.

16. The at least one non-transitory computer readable medium of claim 15, wherein the recognized text is analyzed to understand a meaning of the speech input to guide, at least in part, the selecting of the second audio animation.

17. The at least one non-transitory computer readable medium of claim 13, wherein the first audio animation and the second audio animation are described using a structured format, each respective description including, for each of the first plurality of frames in the first audio animation and for each of the second plurality of frames in the second audio animation, respectively, a reference to the respective at least one audio element, one or more parameters for rendering the respective at least one audio element, and a specification of the criteria for exiting the respective frame and/or audio animation.

18. The at least one non-transitory computer readable medium of claim 17, wherein rendering the first audio animation and the second audio animation comprises parsing the respective description of the first audio animation and the second audio animation and playing back the respective at least one audio element in accordance with the corresponding description.

19. The at least one non-transitory computer readable medium of claim 17, wherein the structured format includes extended mark-up language (XML).

20. The at least one non-transitory computer readable medium of claim 13, wherein at least one portion of narrative is speech generated by a text-to-speech (TTS) application.

21. The at least one non-transitory computer readable medium of claim 13, wherein the respective at least one gate of at least one of the first plurality of frames indicates criteria for transitioning to and identification of a subsequent frame that includes a random or pseudorandom value.

22. The at least one non-transitory computer readable medium of claim 13, wherein the interactive audio presentation, when rendered, presents an interactive fiction presentation to the user.

23. The at least one non-transitory computer readable medium of claim 13, wherein the interactive audio presentation, when rendered, presents an instructional presentation to the user.

24. The at least one non-transitory computer readable medium of claim 13, wherein the interactive audio presentation, when rendered, presents an interactive advertisement to the user.

25. A system for providing an interactive audio presentation, at least in part, by rendering a plurality of audio animations, each audio animation comprising a plurality of frames, the system comprising:

at least one computer readable medium for storing the plurality of audio animations; and at least one processor capable of accessing the at least one computer readable medium, the at least one processor configured to:

render a first audio animation of the plurality of animations, the first audio animation comprising a first plurality of frames, each of the first plurality of frames comprising a duration, at least one audio element, and at least one gate indicating criteria for identification of and transitioning to a subsequent frame and/or a subsequent animation, wherein at least one of the first plurality of frames includes, as the respective at least one audio element, a portion of narrative associated with the presentation that is audibly rendered to a user, and wherein rendering the first audio animation comprises traversing the first plurality of frames at least in part by:

audibly rendering the respective at least one audio element in a first frame of the first plurality of frames;

identifying and transitioning to a second frame of the first plurality of frames according to the respective at least one gate of the first frame; and while audibly rendering the respective at least one audio element in the first frame, simultaneously audibly rendering the respective at least one audio element in the second frame of the first plurality of frames;

select a second audio animation from the plurality of animations based, at least in part, on input from the user associated with the presentation, the second audio animation comprising a second plurality of frames, each of the second plurality of frames comprising a duration, at least one audio element, and at least one gate indicating criteria for identification of and transitioning to a subsequent frame and/or a subsequent animation;

and render the second audio animation by traversing the second plurality of frames in accordance with each respective at least one gate;

wherein the respective at least one gate of at least one of the first plurality of frames indicates criteria for transitioning to and identification of a subsequent frame according to one or more probabilities.

26. The system of claim 25, further comprising at least one input to receive speech input from the user.

27. The system of claim 26, wherein speech input from the user is processed by automatic speech recognition (ASR) to provide recognized text.

28. The system of claim 27, wherein the recognized text is analyzed to understand a meaning of the speech input to instruct the at least one processor, at least in part, on the selection of the second audio animation.

29. The system of claim 25, further comprising at least one output capable of outputting audio to the user.

30. The system of claim 29, wherein at least one portion of narrative is output as speech generated by a text-to-speech (TTS) application.

31. The system of claim 25, wherein the first audio animation and the second audio animation are described using a structured format, each respective description including, for each of the first plurality of frames in the first audio animation and for each of the second plurality of frames in the second audio animation, respectively, a reference to the respective at least one audio element, one or more parameters for rendering the respective at least one audio element, and a specification of the criteria for exiting the respective frame and/or audio animation.

32. The system of claim 31, wherein the at least one computer is configured to render the first audio animation and the second audio animation, at least in part, by parsing the respective description of the first audio animation and the second audio animation and playing back the respective at least one audio element in accordance with the corresponding description.

33. The system of claim 31, wherein the structured format includes extended mark-up language (XML).

34. The system of claim 25, wherein the respective at least one gate of at least one of the first plurality of frames indicates criteria for transitioning to and identification of a subsequent frame that includes a random or pseudorandom value.

35. The system of claim 25, wherein the interactive audio presentation, when rendered, presents an interactive fiction presentation to the user.

36. The system of claim 25, wherein the interactive audio presentation, when rendered, presents an instructional presentation to the user.

37. The system of claim 25, wherein the interactive audio presentation, when rendered, presents an interactive advertisement to the user.

* * * * *